United States Patent [19]

Williams

[11] 4,435,892
[45] Mar. 13, 1984

[54] METHOD OF DISASSEMBLING WOODEN PALLETS

[75] Inventor: Lonnie M. Williams, Greene County, Ill.

[73] Assignee: Williams Panel Board Company, Roodhouse, Ill.

[21] Appl. No.: 356,246

[22] Filed: Mar. 8, 1982

Related U.S. Application Data

[62] Division of Ser. No. 91,517, Nov. 5, 1979, Pat. No. 4,320,570.

[51] Int. Cl.³ .............................................. B23P 19/04
[52] U.S. Cl. .................................... 29/239; 29/564.3; 83/477
[58] Field of Search ...................... 29/564.3, 239, 252, 29/33 R, 700; 83/477, 477.1, 925 R

[56] References Cited

U.S. PATENT DOCUMENTS

| | | | |
|---|---|---|---|
| 3,869,780 | 3/1975 | Ginnow et al. | 83/477 |
| 4,152,819 | 3/1979 | Conkle | 29/252 |
| 4,241,495 | 12/1980 | Wakeen | 29/252 X |
| 4,320,570 | 3/1982 | Williams | 29/564.3 |

*Primary Examiner*—William R. Briggs

[57] ABSTRACT

Apparatus for the disassembly of wooden pallets or the like is disclosed. Generally, a pallet comprises a nailed together wood structure having a plurality of parallel, spaced stringers and a plurality of slats nailed to the top and bottom faces of the stringers and extending generally transversely thereof. The apparatus of this invention comprises a frame, a table mounted on the frame for receiving a pallet to be disassembled, and a plurality of cutters, one for a respective stringer, for cutting the nails holding the slats to a respective stringer. The table with the pallet thereon is movable from a retracted position in which the pallet is clear of the nail cutters to an operative position. A pallet clamp is provided on the table for holding the pallet in position with its stringers extending parallel to the direction of movement of the table. The nail cutters are adjustably movable in transverse direction so that at least certain of the nail cutters may be aligned with respective stringers.

4 Claims, 18 Drawing Figures

METHOD OF DISASSEMBLING WOODEN PALLETS

This is a division of application Ser. No. 91,517, filed Nov. 5, 1979, now U.S. Pat. No. 4,320,570.

BACKGROUND OF THE INVENTION

This invention relates to apparatus for and method of disassembling (or partially disassembling) nailed together wooden structures, such as wooden pallets or the like.

Generally, wood pallets are used in many industries for the handling of various goods or materials. A pallet typically is a platform on which goods are stacked or otherwise supported with the pallet serving as a stacking platform or support so as to facilitate the handling of the entire load of goods stacked on the pallet by means of a forklift. A wood pallet generally consists of a plurality of spaced wood stringer members extending generally in parallel direction. Oftentimes the stringer members are made of 2×4 lumber and are stood on edge so that their widest sides extend vertically. A number of wooden slats made, for example, of 1×4 lumber or the like are placed transversely across the stringers and are nailed to the upper and lower faces of the stringers. The pallets may be rectangular or square (when viewed in plan) and may have slats nailed to the top and bottom faces of the stringers or only to the top of the stringer members. It will be appreciated that with the pallet resting on the floor and with the load supported on the upper slats, the lifting tines of a forklift may be readily inserted into the pallet between the stringers below the top slats so as to facilitate lifting of the pallet together with its load.

In use, pallets oftentimes become damaged thus necessitating their repair or disposal. In order to economically repair pallets, it is necessary that the damaged wood members be readily removed and replaced. It is especially difficult to remove a stringer because all of the slats nailed thereto must be removed. To this end, apparatus, such as is shown in U.S. Pat. No. 3,869,780, has become available in the pallet industry. In general, the apparatus shown in the above-noted patent operates by moving a pallet to be repaired past a stationary nail cutter (e.g., a pair of overlapping rotary cutting wheels) carried on a buck or cantilevered support so as to shear the nails holding the slats to one edge of a respective stringer. By turning the pallet over, by aligning the same stringer with the nail cutter, and by repeating the nail cutting operation, all of the nails holding a stringer in place within the pallet may be cut thus permitting the removal of the stringer. U.S. Pat. No. 4,152,819 discloses an improvement of the apparatus shown in the above-noted '780 patent in which the circular knife blades are particularly well-suited to cut hardened, machine driven nails. However, while the above apparatus did represent an improvement over prior pallet repair techniques, the apparatus of the '780 patent was relatively slow as it took ten or more seconds to cut the nails on each side of each stringer, and the apparatus of both prior patents required that the pallet be turned over and repositioned so as to cut the nails holding the slats to both faces of a stringer.

In recent years, the cost of the lumber required to construct a pallet has steadily increased. Pallet refurbishing operators have known for some time that lumber from damaged pallets can be used in the construction or repair of other pallets. Heretofore, however, it often was not feasible to manually disassemble damaged pallets for the purpose of salvaging lumber therefrom due to the labor costs involved in properly disassembling a pallet.

Reference may also be made to such prior U.S. patents as U.S. Pat. Nos. 2,593,843, 3,512,242 and 3,740,815 which disclose various prior pallet disassembling apparatus. In general, these prior apparatus function by pulling the slats from the stringer so as to disassemble the pallet. However, it will be appreciated that with the slats pulled from the stringers, that sharp nails extend from the slats and must be removed thus resulting in further labor costs and presenting a significant hazard to personnel handling the disassembled lumber.

The apparatus shown in the above-noted U.S. Pat. No. 3,869,780 has been used in the total disassembly or stripping of pallets. However, the relatively slow operating speed of the apparatus and the necessity for multiple repositioning the pallet relative to the nail cutting blades results in high labor costs for totally disassembling pallets thus eliminating, at least in part, some of the advantages gained by disassembling damaged pallets for the purpose of reclaiming lumber.

Among the several objects and features of this invention may be noted the provision of apparatus for and method of disassembling wooden pallets in an efficient and economical manor substantially without causing damage to the wooden members;

The provision of such apparatus which permits a pallet to be disassembled to be readily placed in the apparatus and which requires a minimum of repositioning of the pallet during operation of the apparatus;

The provision of such apparatus which may be readily adjusted to accommodate pallets of various configurations and sizes;

The provision of such apparatus in which certain of the nail cutting means are self-aligned with the nails in a respective stringer upon cutting the nails once the nail cutters have been generally aligned with the respective stringers so as to effect nail cutting substantially without damage to or interference from the wood members of the pallet;

The provision of such an apparatus which aids workmen by automatically separating the stringers from the slats and by automatically removing wood members from the apparatus;

The provision of such apparatus which is of rugged construction and which is reliable in operation;

The provision of such apparatus and method which enables the slats to be cut loose from the top and bottom of the stringers without repositioning or turning the pallet; and The provision of such apparatus and method which requires minimum amount of labor and time to use.

Other objects and features of this invention will be in part apparent and in part pointed out hereinafter.

SUMMARY OF THE INVENTION

Briefly stated, apparatus of this invention is provided for the disassembly of wooden pallets or the like, these pallets comprising nailed together wood structures having a plurality of spaced stringers extending parallel to one another and a plurality of slats nailed to the stringers and extending generally transversely of the stringers. The apparatus comprises a frame, a table mounted on the frame for receiving a pallet to be disassembled, a plurality of nail cutting means, one for a respective stringer, for cutting the nails holding the slats to a respective stringer, and means for moving the table with the pallet thereon from a retracted position in which the pallet is clear of the nail cutting means and an operative position. Additionally, means is provided for clamping the pallet on the table in position with its stringers extending parallel to the direction of movement of the table. Other means is provided for adjustably moving at least some of the nail cutting means transversely relative to the pallet clamped on the table so as to align the nail cutting means with respective stringers.

The method of this invention involves moving a pallet from a loading or a retracted position to a cutting position, the pallet being moved in the longitudinal direction of its stringers as it is moved between its loading and cutting positions. A pair of shear blades is positioned on opposite sides of a stringer at an interface of the stringer and the slats nailed thereto. Then, the shear blades are actuated so as to substantially simultaneously shear all of the nails holding the slats to the above-said stringer at the stated interface so as to free all of the slats from this one stringer. Then, a pair of shear blades is positioned on opposite sides of this one stringer and the other slats nailed thereto. This last-mentioned pair of shear blades is actuated so as to simultaneously shear all of the other slats nailed to this one stringer.

BRIEF DESCRIPTION OF THE DRAWINGS

FIG. 14 is a vertical cross sectional view taken along line 14—14 of FIG. 13a;

Corresponding reference characters indicate corresponding parts throughout the several views of the drawings.

DESCRIPTION OF PREFERRED EMBODIMENTS

Figures 1, 3:
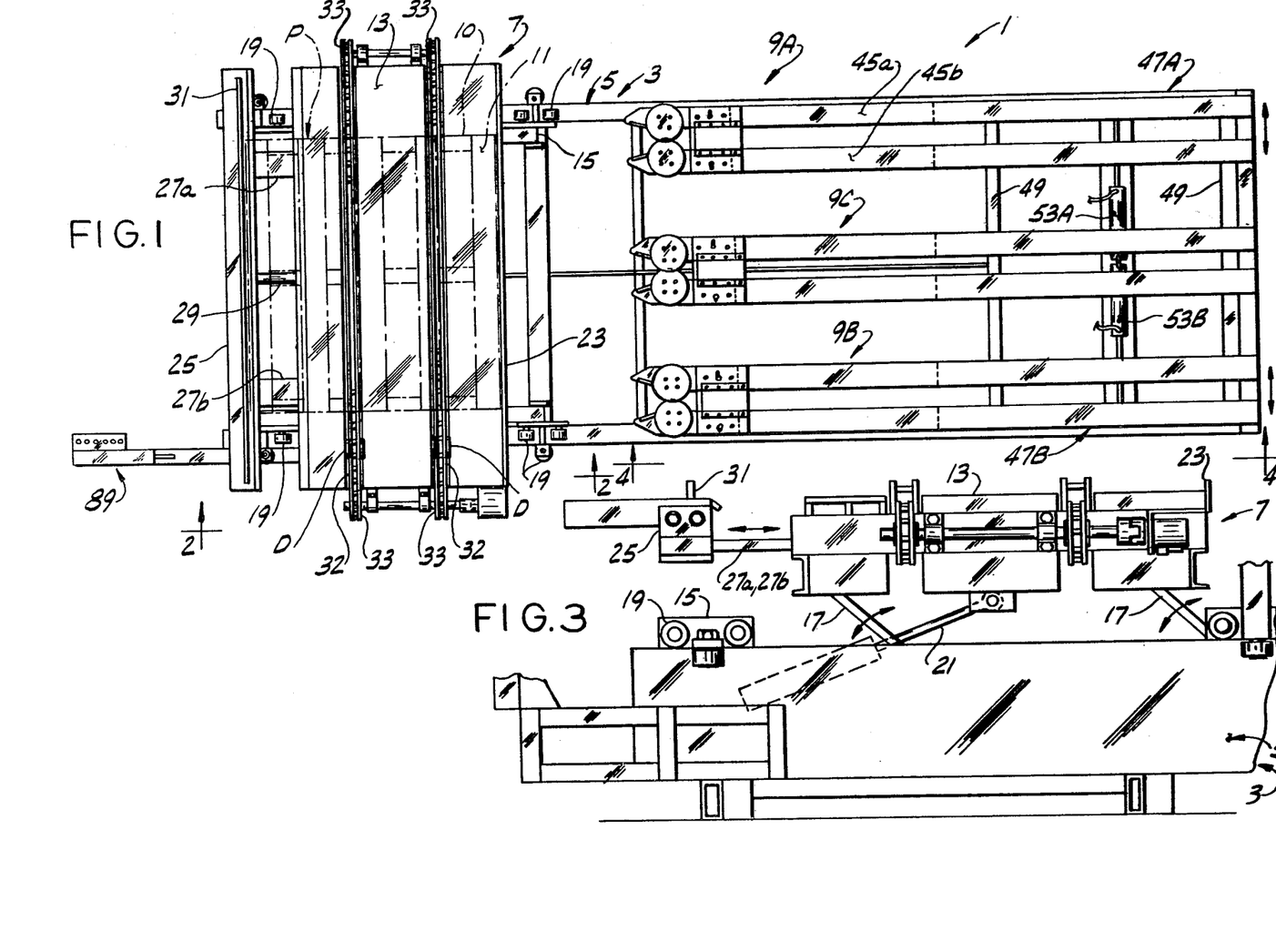
FIG. 1 is a top plan view of apparatus of the present invention for disassembling a wood pallet or other wood structure illustrating in phantom a wood pallet held in place on a table in its retracted position with the various stringers of the wooden pallet aligned generally with respective nail cutting means.
FIG. 3 is a view similar to FIG. 2 illustrating a parallelogram linkage and hydraulic cylinder arrangement for raising and lowering the table on which a pallet to be disassembled is clamped.

Referring now to the drawings, apparatus of this invention is indicated in its entirety at reference character 1 and it is shown to comprise a frame 3 including rail members 5 extending longitudinally of the frame. As is generally indicated at 7, a table is rollingly mounted on rail members 5 for movement therealong in generally longitudinal direction of the apparatus. A plurality of nail cutting means, as generally indicated at 9A, 9B and 9C, is supported at the other end of frame 3. As indicated generally at P, a wooden pallet to be disassembled is positioned and supported on table 7. As is typical, pallet P includes a plurality of parallel stringers 10 spaced apart from one another. As shown in FIG. 1, pallet P includes three parallel stringer members equally spaced from one another and extending in generally longitudinal direction of the pallet. It will be understood however, that pallets having a number of stringers other than three may readily be used in conjunction with the apparatus of the present invention. As is conventional, a plurality of wooden slats 11 are spaced from one another and extend generally transversely of the stringers and are nailed to the upper and lower faces of the stringer by nails N (see FIG. 11).

Table 7 comprises a platform 13 mounted on a carriage 15 by means of a parallelogram linkage arrangement 17 (see FIG. 3). Carriage 15 is mounted on rollers 19 which are engageable with rail members 5 for rollingly supporting the carriage and the platform on the frame as heretofore described. A hydraulic cylinder unit 21 (see FIG. 3) is interposed between carriage 15 and platform 13 for selectively raising and lowering the platform on parallel linkage arrangement 17 relative to the carriage or relative to nail cutting means 9A, 9B or 19C. Of course, parallelogram linkage 17 maintains the platform in generally horizontal position as it is raised and lowered.

Platform 13 has an upper surface which supports pallet P to be disassembled. The platform includes a stationary front abutment member 23 which extends generally transversely across the platform and which is intended to engage the lower leading edge of a pallet P placed on the platform. The latter is provided with a movable clamp member 25 carried by spaced slide members 27a, 27b. Clamp member 25 is movable between an open position (as shown in FIG. 3) and a closed or clamping position (see FIG. 2). The clamp member is moved between its open and clamping position by means of a hydraulic cylinder unit 29 interposed between the platform and the clamp member. The clamp member further has a rear abutment member 31 extending transversely of the platform which is engageable with the lower trailing edge of the pallet. Further, platform 13 is provided with a pair of endless conveyor chains 32 entrained around sprockets 33 provided at the ends of the platform. These chains have dogs D which extend outwardly therefrom and which protrude above the upper surface of platform 13 for engaging wood members (e.g., stringers 10) remaining on the platform after disassembly of the pallet and for conveying these loose wood members to one side of the platform. It will be understood that the chains may be driven through a cycle to remove the loose wood members from the platform by actuating a hydraulic motor (not shown) for at least a partial cycle of the chains around their respective sprockets 33.

Figures 2, 16:
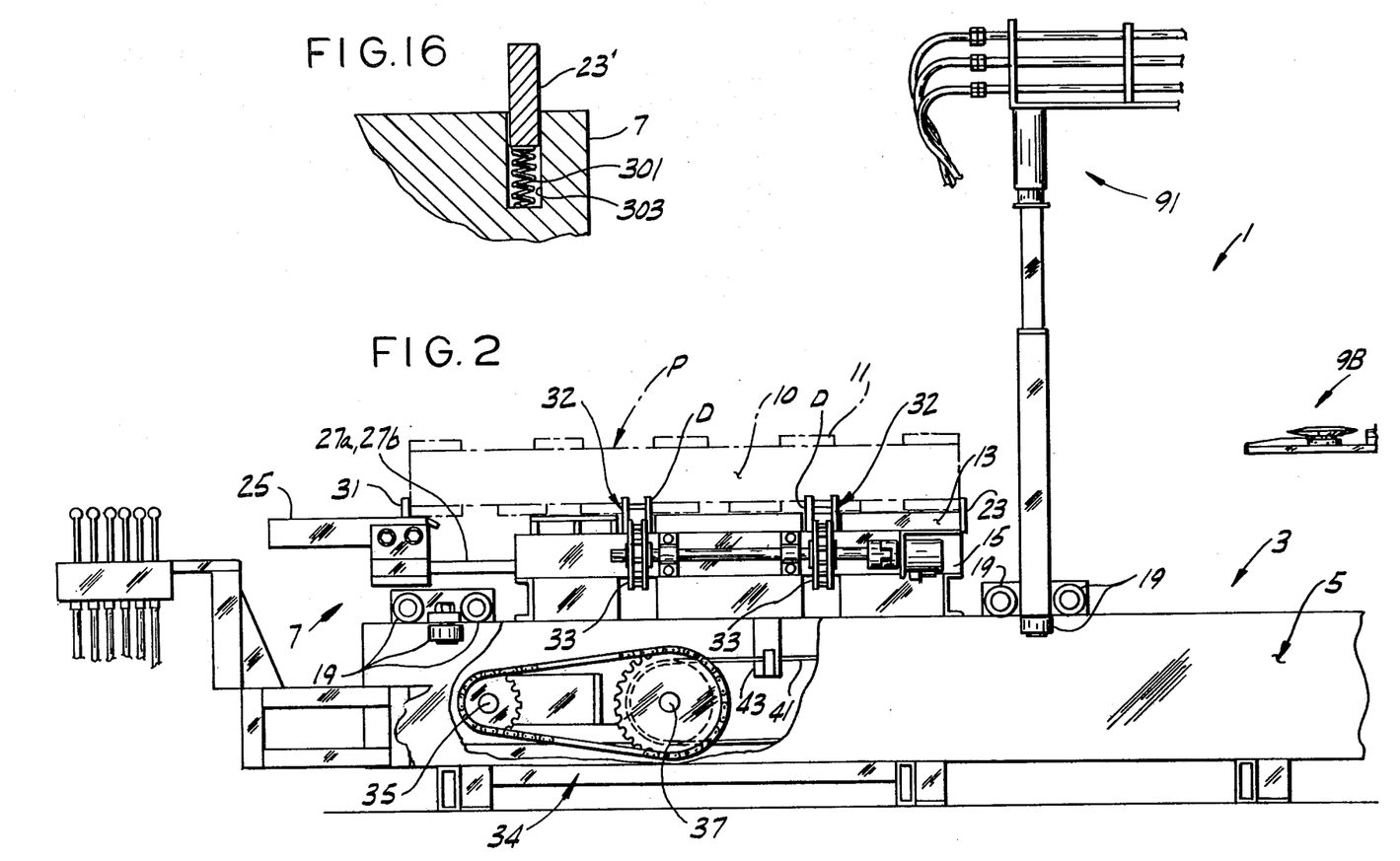
FIG. 2 is an enlarged side elevational view taken along line 2—2 of FIG. 1 illustrating the left hand portion of the apparatus with parts broken away to show internal details.
FIG. 16 (sheet 2) is an enlarged view of a portion of the pallet support table illustrating a spring supported pallet abutment member.
Figure 4:
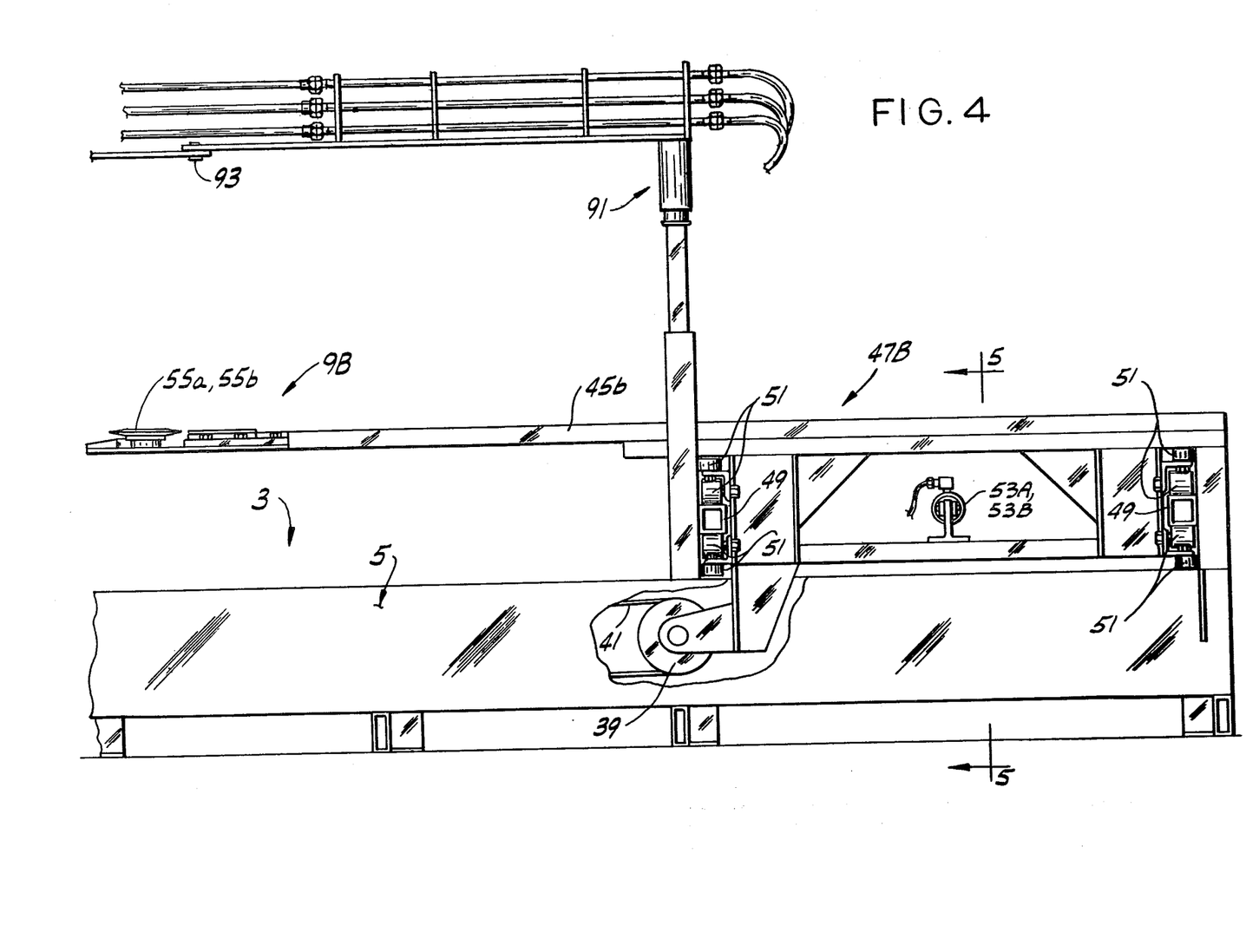
FIG. 4 is an enlarged side elevational view of the right hand portion of the apparatus taken along line 4—4 of FIG. 1 illustrating a wheeled trolley arrangement and power actuated system for adjustably moving certain of the nail cutting means in generally transverse direction of the pallet being disassembled thereby to enable the nail cutting means to be aligned with respective stringers of the pallet.

As generally indicated at 34 in FIG. 2, a hydraulic powered winch and cable assembly is provided in apparatus 1 for forceably moving table 7 relative to frame 5 between a retracted or loading position (as shown in FIGS. 1-3) in which a pallet P may be loaded on and clamped in place on platform 13 such that the pallet is clear of nail cutting means 9A, 9B and 9C and an operative position in which the stringers are in position to be operated on by the nail cutting means. Winch arrangement 34 includes a hydraulic motor 35 which powers a winch 37 in both forward and reverse directions. As shown in FIG. 4, a pulley 39 is journalled on frame 3 distal from the retracted position of table 7. A cable 41 is wound up on one side of winch 37, is trained around pulley 39, and is then wound up on the other side of the winch. Carriage 15 is securely fastened to the upper reach of cable 41 between winch 37 and pulley 39 by means of an attachment clamp 43 (see FIG. 2). Upon operation of winch 37 in one direction, cable 41 is unwound from one side of the winch and is wound up on the other side of the winch causing generally horizontal movement of the upper reach of the cable which in turn causes the carriage connection 43 to move or reciprocate in horizontal direction from its position shown in FIG. 2 toward pulley 39 thereby to effect movement of table 7 from its retracted position toward its operative position. Of course, upon reverse energization of winch 37, table 7 is caused to move toward its retracted position. It will be understood that table 7 may be stopped at any position along its path and that hydraulic motor 31 drives the table along its path at considerable speed. For example, it may take only one or two seconds for the table to make a full trip from its retracted position to its full operative position at which point attachment 43 is proximate pulley 39. Of course, the return stroke of the table may be carried out with comparable speed. It will be understood that limit switches (not shown) along the path of table 7 may be operated to terminate travel of the table at any direction at a desired location along the path of the table in a manner well known to those skilled in the art.

Nail cutting means 9A, 9B and 9C each includes a pair of elongate, cantilevered support arms 45a, 45b. These arms are spaced from one another a distance sufficient to accomodate a stringer 10 of pallet P therebetween (see FIG. 7). The support arms of the center nail cutting means 9C are fixedly mounted on frame 3 so as to be generally in line with the longitudinal centerline of apparatus 1. However, in accordance with this invention, the outer nail cutters 9A and 9B are independently and selectively movable in generally horizontal transverse direction (as shown by the arrows in FIG. 1) relative to the frame so as to enable these outer nail cutters to be aligned with their respective stringers 10 on pallet P which is held in position on table 7 for disassembly. While the arms 45a, 45b of center nail cutting means 9C were hereabove described as being in fixed position, it will be understood that, within the broader aspects of this invention, the center nail cutting means 9C may also be adjustable in transverse position.

More specifically, support arms 45a, 45b for each of the outer nail cutters 9A, 9B are mounted on a respective carriage or trolley 47A, 47B which is movable on rails or tracks 49 secured to frame 3. Specifically, these carriages are movable in transverse direction relative to frame 3. As shown in FIG. 4, tracks 49 face one another and are spaced apart approximately the width of trolleys 47A, 47B. The latter each includes rollers 51 disposed on the top or bottom of each of the tracks 49 so as to rollingly support the trolley for transverse movement relative to the frame and for rigidly holding the arms 45a, 45b cantilevered from the trolley in generally horizontal position.

Figure 5:
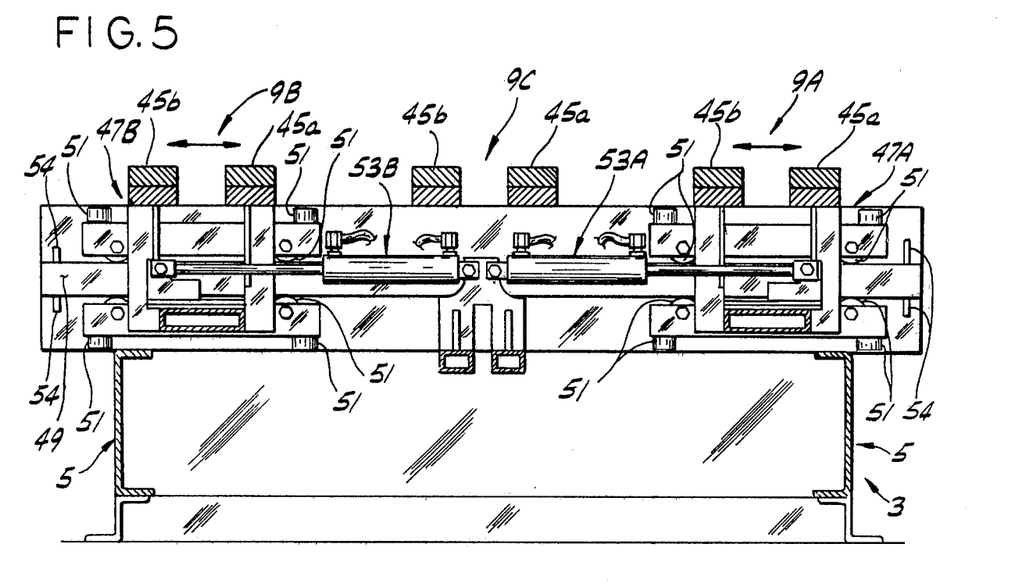
FIG. 5 is a vertical cross sectional view taken along line 5—5 of FIG. 4 illustrating further details of the system for adjustably moving certain of the nail cutting means realative to their respective stringers.

Each trolley 47A or 47B for outer nail cutters 9A, 9B is selectively moved in transverse direction by means of a respective hydraulic cylinder unit as indicated at 53A, 53B (see FIGS. 4 and 5). These hydraulic units are interposed between frame 3 and their respective trolleys. Each of these cylinder units has a stroke of sufficient length so as to transversely move its respective nail cutter 9A or 9B from an inner position adjacent (i.e., contiguous) to the fixed center nail cutting means 9C to an outer position in which the trolleys is in positive engagement with a stop 54 on frame 5. It will be appreciated that when a pallet P is placed on table 7, the pallet is positioned so that at least one stringer 9 (i.e., the center stringer) is generally in line with the fixed center nail cutter 9C. The other nail cutters 9A and 9B may then be respectively aligned with their respective stringers by selectively actuating cylinder units 53A and 53B so as to move the other nail cutters 9A and 9B into alignment with their respective stringers.

In accordance with this invention, once nail cutters 9A and 9B have been generally aligned with their respective stringers 10 (i.e., when the centerline between arms 45a, 45b of each nail cutter assembly is generally in the vertical plane of its respective stringer and in line with the nails N to be cut thereby), hydraulic cylinder units 53A and 53B are opened (i.e., pressure is relieved therefrom) so that the piston and actuator rod of the hydraulic cylinder units are free to be moved in and out of their hydraulic cylinders upon application of axial force in one direction or the other to their actuator rod. As the nail cutter begins to cut nails, a reaction force is, of course, applied to arms 45a, 45b if the nail cutter is not properly positioned on its respective stringer. In turn, a transverse force will be applied thereto which tends to transversely shift its respective trolley 47A or 47B on tracks 49 thereby to effect the automatic self-centering or self-aligning of the nail cutter with regard to its respective stringer 10. Thus, it will be appreciated that with cylinder units 53A or 53B open, these cylinder units in combination with their respective trolleys 47A, 47B constitute means for enabling the self-centering or self-alignment of the nail cutters with their respective stringers upon effecting cutting of nails N.

Figure 6:
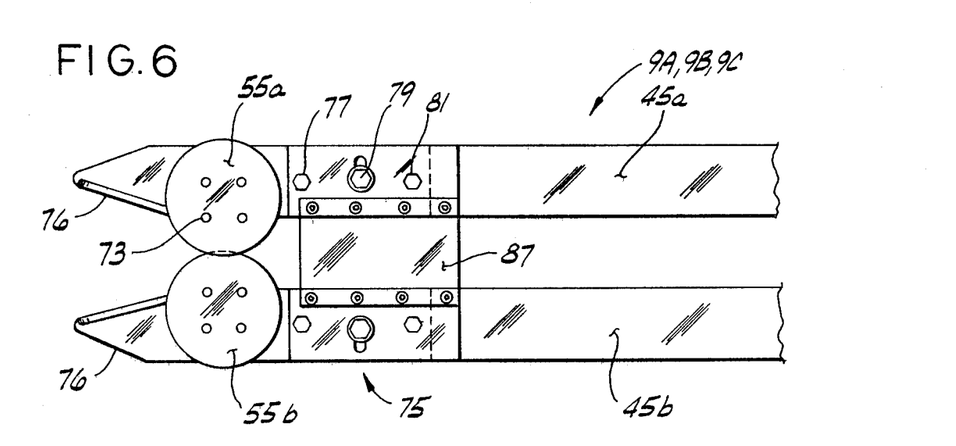
FIG. 6 is an enlarged plan view of one of the nail cutting means, as shown in FIGS. 1-5.
Figure 7:
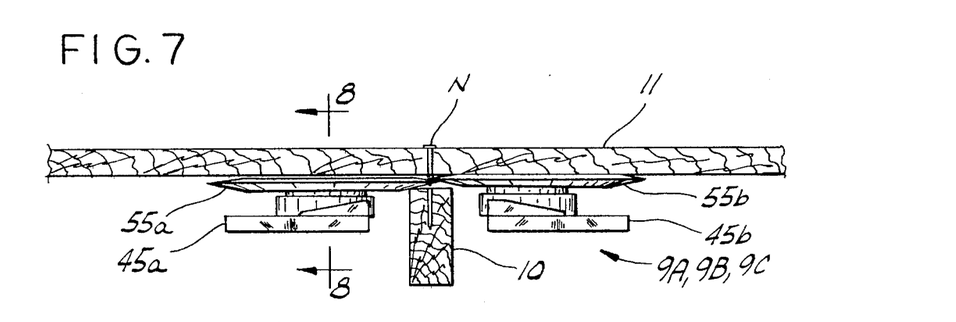
FIG. 7 is a front end elevational view of the nail cutting means shown in FIG. 6 together with a respective stringer and slat member of a typical pallet.
Figure 8:
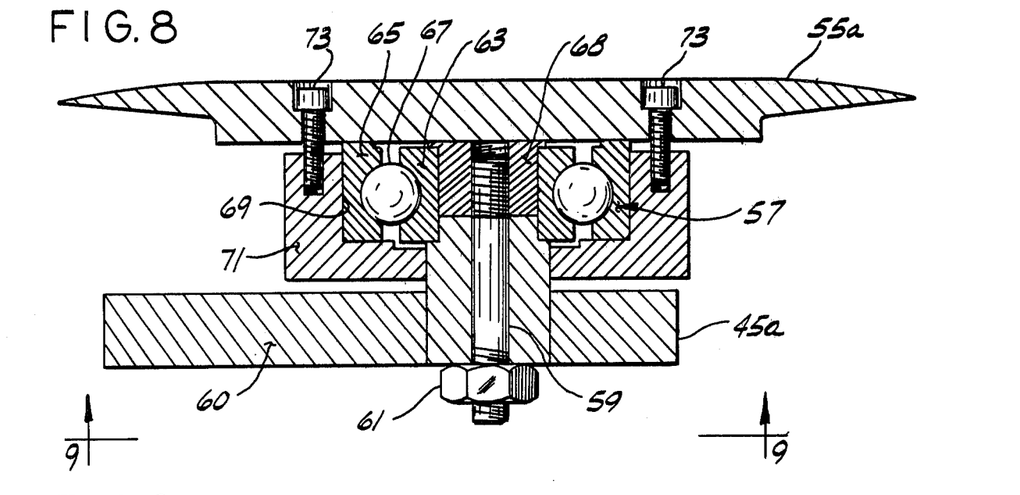
FIG. 8 is an enlarged cross sectional view of one of the nailing cutters taken along line 8—8 of FIG. 7.

Referring now to FIGS. 6–8, a first embodiment of nail cutters 9A, 9B and 9C is therein shown. As illustrated, the nail cutters each comprise a pair of circular cutting blades 55a, 55b carried on the outer or free ends of a respective pair of cantilever arm 45a, 45b. As shown in FIG. 6, a portion of each of these circular blades overlap one another along the longitudinal centerline of the space or gap between arms 45a, 45b and thus are in general sliding, shearing relation in the area of overlap. Each of the blades is rotatably mounted on its respective arm 45a or 45b by means of an anti-friction bearing 57 (e.g., a ball or roller bearing) in such manner as to be free to rotate about a generally vertical axis and in such manner as to be positively held in place on its respective arm and to be undisturbed by the cutting of nails N in the manner as will appear.

In FIG. 8, a blade 55a is shown to be mounted on its arm 45a by means of a stud 59 which in turn is secured to a plate 60. A nut 61 holds stud 59 on plate 60 and the latter is positively secured to the outer end of its respective cantilever arm 45a, 45b in a manner as will be hereinafter described. Bearing 57 includes a inner race 63 and an outer race 65 with roller element 67 disposed therebetween. A sleeve 68 is fitted within inner race 63 of the bearing and stud 59 is received within the sleeve and is bolted in place on its respective arm 45a or 45b. Outer race 65 of the bearing is pressed into a bore 69 of a mounting member 71 so that the mounting member is rotatably supported by the bearing. As indicated at 73, cap screws are countersunk into the center portion of blade 55a and are threaded into mounting member 71 so that the blade is positively secured to and is rotatable with the mounting member. In this manner, rotary cutting blades 55a and 55b are securely fastened to their respective arms 45a, 45b and are thus securly held thereon while cutting nails N.

Figure 9:
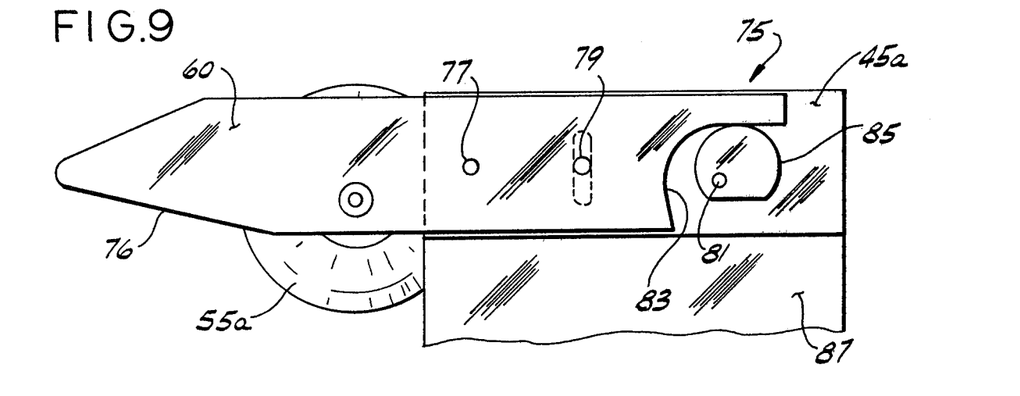
FIG. 9 is a bottom view of the outer end of one of the arms supporting the nail cutting means shown in FIG. 6 and further illustrating means for adjusting the nailing cutting blades relative to one another and for locking the blades in a desired position relative to one another.

Further in accordance with this invention, blades 55a, 55b may be selectively adjusted relative to one another for the purpose of varying the amount of overlap of the cooperating circular blades. As generally indicated at 75 in FIG. 9, means is provided for selectively adjusting the relative positions of the blades relative to one another and relative to their respective arms 45a, 45b and for securely and positively locking the blades in a desired position. As described above, circular blades 55a, 55b are secured to their respective end plates 60 by means of mounting member 71 and bearing 57. The outer end of end plate 60 is preferably pointed, as indicated at 76, so as to guide respective stringers 10 into proper cutting relation with the blades. Means 75 is shown to comprise a pivot bolt 77 located adjacent the outer end of its respective arm 45a or 45b, and a slotted bolt connection 79 between plate 60 and its respective arm 45a or 45b, and a cam lock bolt 81 (see FIG. 6). As shown in FIG. 9, plate 60 is cut out, as indicated at 83, so as to receive an eccentric locking cam 85 carried by cam lock bolt 81. It will be appreciated that by loosening bolts 77, 79 and 81, plate 60 may be pivotted at about pivot bolt 77 to any desired angular position relative to its respective arm 45a or 45b. With the plate in its desired angular position with respect to its arm, cam 85 may be brought into firm engagement with cam surface 83 on plate 60. Upon tightening of cam lock bolt 81, the cam of course will be firmly locked in place against plate 60 and it will positively prevent rotation of the plate in at least one direction. Of course, bolts 77 and 79 may also be tightened to more securely hold plate 60 in is desired angular position with respect to its respective arm 45a or 45b.

Again referring to FIG. 6, a plate 87 is welded or otherwise rigidly secured between the upper faces of arms 45a, 45b adjacent cutting wheels 55a, 55b. Preferably, plate 87 is of spring steel or the like so as to resiliently link arms 45a, 45b together and so as to permit at least some degree of resilient relative movement between the arms. Further, the upper surface of plate 87 is disposed approximately at the level of cutting knives 55a, 55b for aiding in handling slats 11 after they have been disassembled from pallet P.

The various hydraulic cylinder units and hydraulic motors heretofore described in apparatus 1 may, of course, be supplied with hydraulic fluid under pressure from any suitable source. For example, any one of a number of well-known and commercially available hydraulic motor and pump sets (not shown) may be utilized. Furthermore, each of the hydraulic components of apparatus 1 may readily be controlled from an operators console 89 provided at one end (the left end of the apparatus as viewed in FIG. 1). It will be appreciated that operator console 89 may include various control valves, such as a Model CM2N02R25DOCDDBL30 control valve commercially available from the Vickers Company, Division of Sperry Rand Company of Troy, Mich. These valves may be selectively operated so as to control operation of table lift cylinder 21, clamp cylinder 29, winch motor 35, nail cutter cylinders 53a, 53b, and the hydraulic motor powering chain conveyors 32. Furthermore, hydraulic lines for supplying hydraulic fluid to hydraulic cylinders 21 and 29 and to the motor for driving chain conveyors 32 on table 7 are supported by an articulated hose support 91 (see FIGS. 2 and 4) which is pivotally attached to frame 3 and to table 7 and which has a pivoted knee 93. In this manner, the various hydraulic lines for supplying hydraulic fluid to the hydraulic components of table 7 are supported above the level of nail cutting means 9A, 9B and 9C and are maintained clear of all other structure of apparatus 1 during operation of the machine and during movement of table 7 between its retracted and operative positions.

In operation, a pallet P is moved into a desired position on platform 13 of table 7 and is oriented with its stringers 10 extending generally parallel to the direction of movement of table 7 on frame 3. The pallet P shown in FIG. 1 has three stringers 10 so that all of the upper slats 11 of the pallet may be disassembled from one face (i.e., the upper face) of stringers 10 upon one pass of table 7 relative to nail cutters 9A, 9B and 9C. It will be understood, however, that pallets having other numbers of stringers 10 may be readily disassembled by means of apparatus 1 of the present invention.

With pallet P positioned on platform 13, the center stringer of the pallet is aligned with the center, or fixed position nail cutter 9C. Then, hydraulic cylinder units 53A, 53B are selectively energized so as to shift trolleys 47A and 47B in transverse direction with respect to frame 3 so as to align their respective nail cutters 9A, 9B with respect to other stringers of pallet P. Then, hydraulic cylinder unit 29 is actuated so as to move clamp member 25 into firm clamping engagement with the trailing edge of the pallet and so as to firmly hold the pallet in place between front abutment member 23 and rear abutment member 31. Then, hydraulic cylinder unit 21 is selectively energized to raise or lower platform 13 relative to the nail cutters so that the interface between the upper slats 11 and the upper face of stringers 10 of pallet P are generally in the horizontal plane of blades 55a, 55b of the nail cutters. Motor 35 is then energized with hydraulic fluid under pressure so as to cause operation of winch 37 in such direction to forceably shift the upper reach of cable 41 and attachment 43 to move to the right (as shown in FIG. 2) thereby to in turn cause table 7 to move from its retracted or loading position toward its operative position. As the forward or leading ends of stringers 10 encounter their respective nail cutting knives 55a, 55b, the edges of the knives are forced, by movement of table 7 with the pallet P clamped, between the interface of the stringers 10 and the upper slats 11. As the knives engage nails N holding the upper slats in place, the nails are sheared by the knives thereby disassembling the upper slats from the stringers. Of course, on a three stringer pallet, all of the upper slats are disassembled from their respective stringers by the three nail cutting means upon one cycle of table 7 from its retracted to operative position. As the slats are disassembled from their respective stringers, they pile up on the upper surfaces of arms 45a, 45b and are supported thereby. As other pallets are disassembled, the slats will accumulate on the upper surfaces of arms 45a, and 45b. Of course, workmen may manually remove the disassembled slats or they may be automatically fed directly from the rear end of apparatus 1 of this invention into suitable automatic sawing equipment (not shown) for cutting the newly disassembled lumber into usable sizes.

Further in accordance with this invention, it will be appreciated that table 7 is moved relatively rapidly from its retracted position to its operative position thereby to effect the cutting of nails N and to return to its retracted position. For example, by using motor 35 and winch 37 to move table 7, the table may be moved through a full cycle in a matter of a few seconds (e.g., 2-4 seconds) thereby to simultaneously disassemble all of the upper slats from the stringers. By moving the table in relatively high speed relative to the nailing plates, the efficient shearing of nails N is accomplished substantially without splitting or damage to either the stringers or the slat members. Surprisingly, not only does the increased operating speed of the apparatus of the present invention markedly increase the production rate of the machine, but the percentage of boards damaged by the machine of this invention is lower than experienced in using the slower prior art apparatus.

After the upper slats 11 have been removed from pallet P, and after table 7 has been returned to its retracted position, clamp member 25 is moved to its open position and the remaining portion of the pallet is manually turned over on table 7 so that the slats that formerly constituted the bottom slats of the pallet face upwardly. Again, the center stringer of the pallet is aligned with the fixed center nail cutting means 9C and clamp member 25 is brought into firm clamping engagement with the trailing ends of the stringers thereby to firmly hold the pallet on table 7 between abutments 23 and 31. Assuming that the outer stringers are each symetrically located with respect to the center stringer, adjustment of the outer nailing cutters 9A and 9B is usually not necessary upon turning of the pallet. Of course, it will be also understood that if similar pallets are being disassembled, once the outer nail cutting means positioned for that type of pallet being disassembled, the position of the outer nail cutters will not, in most cases, have to be adjusted until another size pallet is desired to be disassembled. Table 7 is then reciprocated from its retracted position toward its operative position and the now upwardly facing slats 11 are disassembled from their respective stringers by nail cutters 9A, 9B and 9C thus cutting the nails holding the slats in place on their stringers.

Upon the return of table 7 to its retracted position and upon the release of clamp member 25, chain conveyor 32 is energized so as to automatically remove the stringer members 10 from table 7. It will be appreciated that upon disassembling pallets, all of the slats 11 are collected at the rear end of apparatus 1 adjacent trolleys 7 on the upper surfaces of arms 45a and 45b and that all stringer members are collected at the side of table 7. In this manner, the various different wood members of the pallets are separated from one another without the requirement of a subsequent sorting operations.

Figure 10:
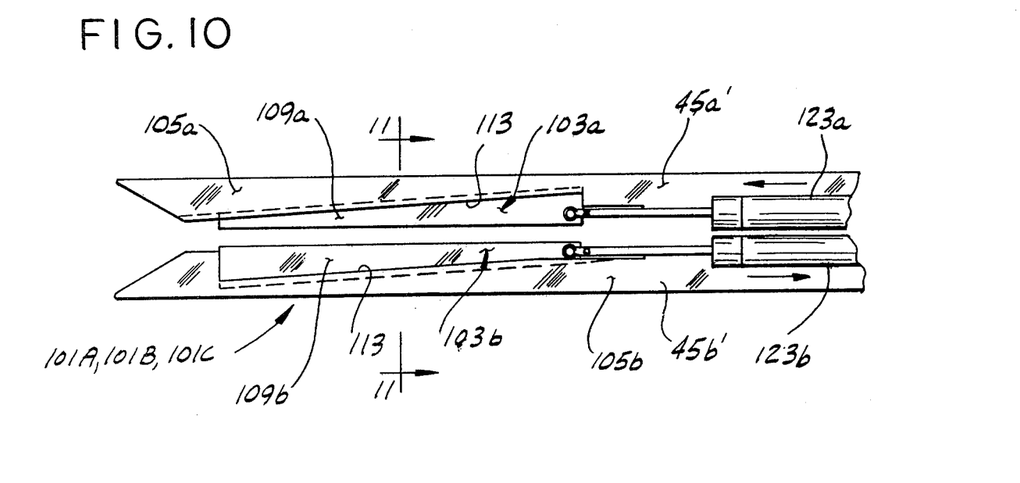
FIG. 10 is a plan view of another embodiment of a nail cutting means of the present invention having a pair of opposed shear blades movable relative to one another for severing or shearing the nails holding the slats to a respective stringer.
Figure 11:
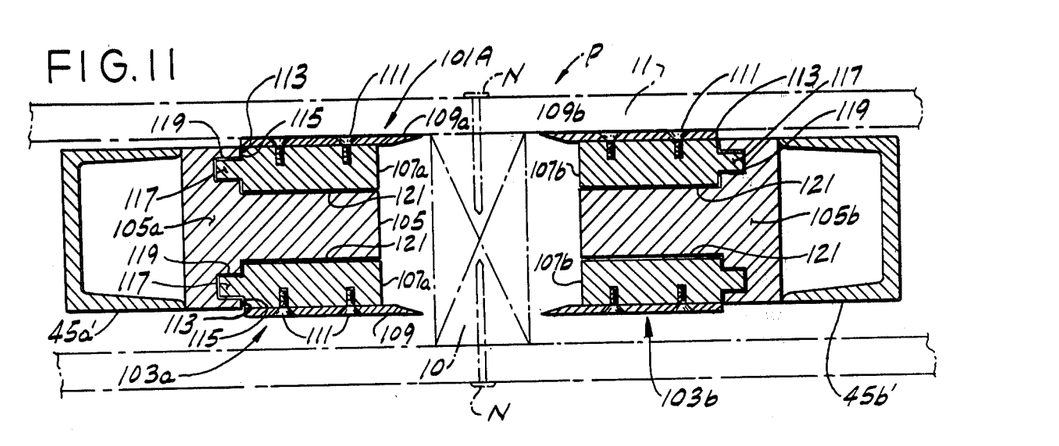
FIG. 11 is a cross sectional view of this second nail cutting means taken along line 11—11 of FIG. 10 illustrating an upper blade for cutting the nails holding the upper slats to a respective stringer and, upon repositioning of the blade assembly relative to the stringer, having a lower blade for cutting the nails holding the bottom slats to the stringer thereby to effect cutting of both the top and bottom nails without repositioning or turning of the wood pallet on the apparatus.
Figure 12:
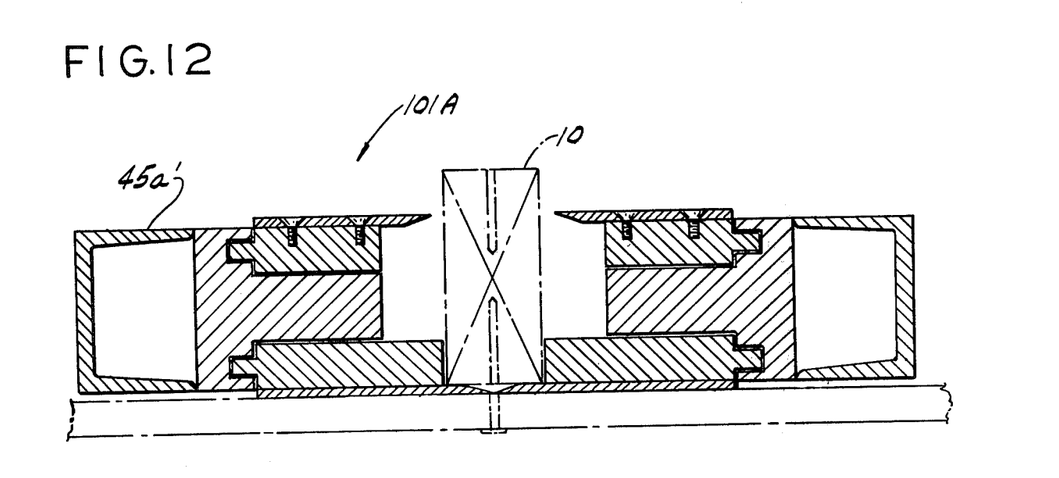
FIG. 12 is a view similar to FIG. 11 depicting the lower bottom blade in its actuated position for cutting the nails adjoining the slats to the bottom of the stringer.

Referring now to FIGS. 10-12, another embodiment of nail cutters 9A, 9B and 9C is illustrated, these other nail cutters being generally indicated in their entirety at 101A, 101B and 101C. It will be understood that nail cutters 101A, 101B and 101C are supporred on cantilever arms 45a', 45b' and on trolleys 47A', 47B' in the manner of nail cutter 9A, 9B and 9C. The primed reference characters indicate parts of similar construction and operation as parts heretofore described.

Generally, these other nail cutters are identical to one another and thus only nail cutter 101A will be described in detail. Specifically, nail cutter 101A comprises a pair of reciprocable shear blade assemblies 103a, 103b carried by a respective pair of spaced arms 45a', 45b'. As shown in FIG. 11, each shear blade assembly 103a or 103b comprises a slide support member 105a, 105b secured (e.g., welded) to the inner face of its respective support arm 45a', 45b'. At least one slide member 107a, 107b is slidably mounted on its respective slide support 105a, 105b for sliding in generally axial or longitudinal direction with respect to support arms 45a', 45b'. A shear blade 109a, 109b is preferably removably secured to the upper surface of its respective slide member 107a, 107b by means of countersunk bolts or screws 111. As best shown in FIG. 10, slide support members 105a, 105b each have an upright inclined or angled cam surface 113 cammingly engageable with a respective cam surface 115 on its respective slide member 107a, 107b thereby to effect inward movement of the slide member and its shear blade relative to its slide support member upon longitudinal movement of the slide member relative to its slide support. As shown in FIG. 10, cam surfaces 113 of shear blade assemblies 103a and 103b slope in opposite directions so that upon outward longitudinal movement of slide 103a toward the free end of its respective support arm 45a', its respective shear blade 109a moves in toward a stringer member disposed between its respective support arms. On the other hand, the cam surface 113 of shear blade assembly 103b is sloped so as to effect inward movement of the shear blade upon longitudinal movement of its slide 109b away from the outer end of its respective support arm 45b'. In this manner, the simultaneous actuation of the shear blade assemblies 103a, 103b in opposite longitudinal directions causes them to close on their respective stringer member and to shear nails N substantially simultaneously along the entire length of the stringer.

Slide members 107a, 107b are each provided with a tongue 117 (FIG. 12) which fits into a respective horizontal groove 119 in the cam surface 113 of its respective slide support member 105a, 105b thereby to maintain the slide member in desired vertical position on its slide support member. Of course, the slide member slidably rests on a horizontal surface 121 of its slide support member and the slide member and its support have suitable lubrication grease or the like therebetween so as to permit ready sliding movement therebetween. Of course, suitable retainers (not shown) may be utilized to hold blade 109a, 109b in place on their respective slide support members 105a, 105b.

Each shear blade assembly 103a, 103b is reciprocated in generally longitudinal direction with respect to its support arm 45a', 45b' by means of a respective hydraulic cylinder unit 123a, 123b (FIG. 10) interposed between the inner end of the shear blade assembly and its respective support arm. These hydraulic cylinder units may of course be double acting cylinder units so as to forceably push and pull the shear blades relative to their support arms thereby to effect opening and closing of the shear blades.

Referring now to FIG. 11, each shear blade assembly 103a, 103b is further shown to comprise an upper set of shear blades and a lower set of shear blades substantially identical to one another which are operable independently of one another. It will further be noted in FIG. 11 that the height or thickness of the shear blade assembly 103a is somewhat less than the height of stringer 10 of a typical pallet P for purposes as will hereinafter appear.

In operation, the second embodiment of apparatus 1 of this invention incorporating nail cutting means 101A, 101B, and 101C will hereinafter be described. With a pallet P oriented on table 7 and clamped in position generally as heretofore described, the table is moved from its retracted or loading position to its operative position. As the pallet moves toward its operative position, each of the stringers 10 of the pallet is received between a pair of respective support arms 45a', 45b'. Of course, it is understood that the outer nail cutting means 101A and 101B are movable in transverse direction in the manner similar to nail cutting means 9A, 9B heretofore discussed. With the pallet in its fully operative position, shear blade assemblies 103a, 103b of each nail cutting means 101A, 101B, 101C extend along the entire length of each of the stringers on opposite sides thereof. Then, cylinder unit 21 is actuated so as to adjust the height of pallet P relative to the upper shear blades by raising or lowering platform 13 so that the upper shear blade 109 of each shear blade assembly 103a, 103b is in general alignment with the interface between the top of stringer 10 and the bottom face of the upper slats 11 (see FIG. 11). Then, upper cylinders 123a, 123b of all the nailing cutters 101A, 101B and 101C are simultaneously actuated thereby to effect closing of the upper shearing blades on their respective stringers so as to shear nails N holding the upper slats to the stringers along the entire length of the pallet. In this manner, all of the nails holding the upper slats in place on the pallet may be substantially simultaneously cut. Of course, after cutting the upper nails N, the upper shear blades are moved back to their retracted positions. Then, hydraulic cylinder 21 is actuated so as to raise platform 13 thereby to bring lower shear blades 109 generally into the plane of the interface between the lower slats 11 and the bottom face of stringer 10 (FIG. 12). Hydraulic cylinders 123a, 123b for the lower shear blades are then actuated thereby to cut nails N holding the lower slats onto the stringers.

In this manner it will be appreciated both the upper and lower slats can be completely disassembled from the stringers in a relatively short time and that the pallet need not be manually turned over to effect the cutting of the bottom slats from the stringers and that table 7 only need make one cycle for completely disassembling a pallet P. Of course, it will be appreciated that this greatly increases the operating and production speed of the apparatus of this invention.

Figure 13A:
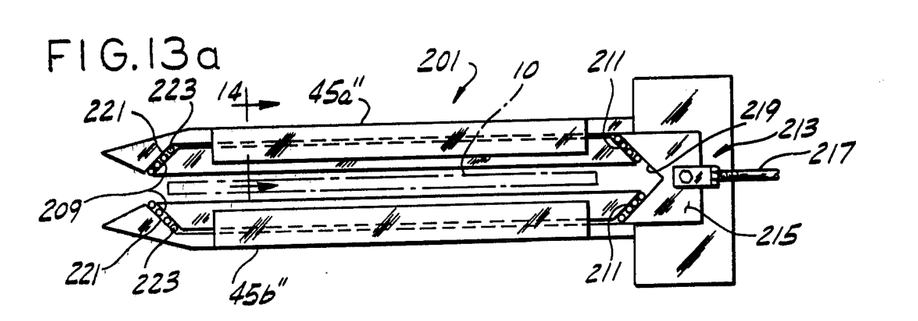
FIGS. 13a–13c are plan views of still another embodiment of nail cutting means of the present invention utilizing shear blades for cutting the nails, these views depicting various stages of the shearing action of this nail cutting means.
Figure 13B:
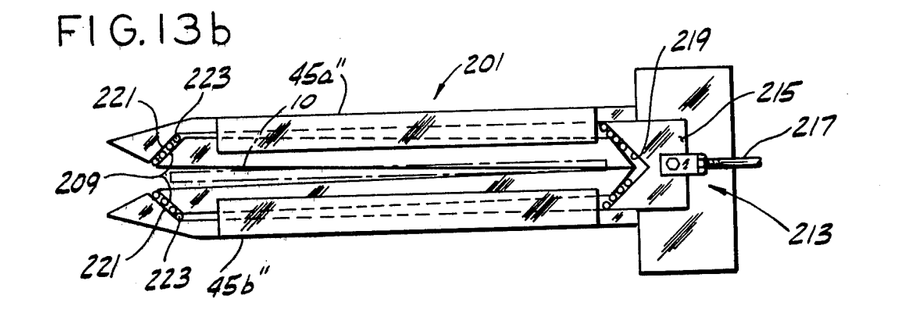
Figure 13C:
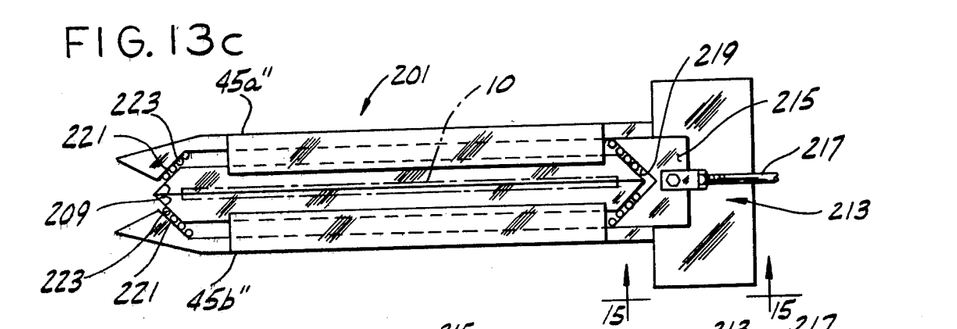
Figure 14:
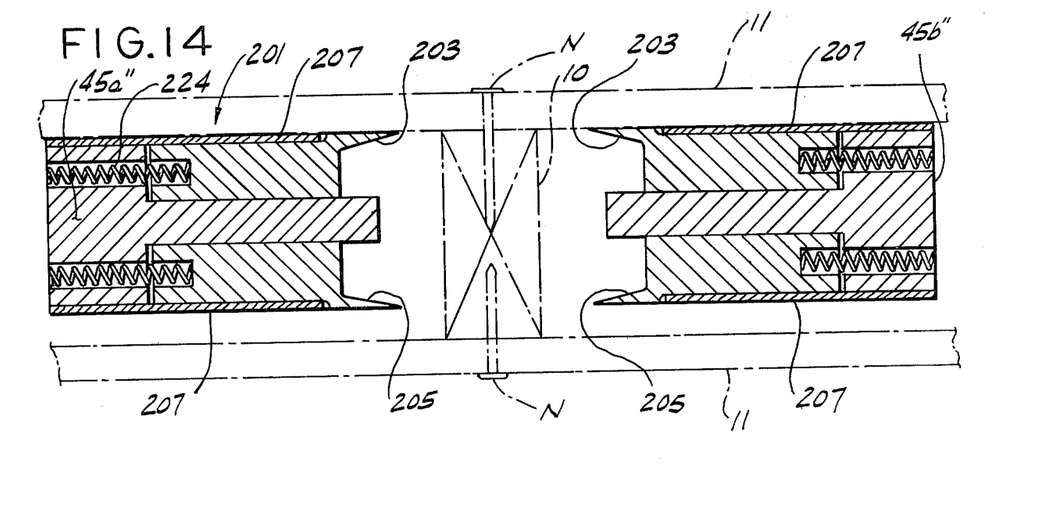

Referring now to FIGS. 13a, 13b and 13c, and to FIG. 14, still another embodiment of the nailing cutter is illustrated. In the above-noted drawing figures, only one nailing cutter, as is generally depicted by reference character 201, is illustrated for purposes of simplicity, but it will be appreciated that three of these nailing cutters 201 may be provided on apparatus 1 in a manner similar to that as nailing cutters 101A, 101B, and 101C as heretofore described. Further, in the description of nailing cutter 201, the "double primed" reference characters indicate parts of similar function and of generally the same construction as parts heretofore described.

Figure 15:
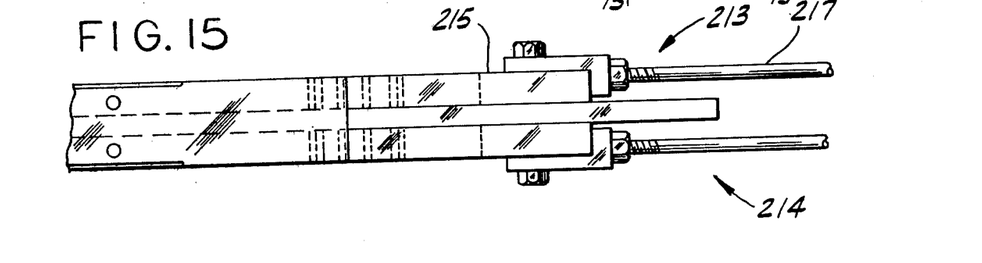
FIG. 15 is an enlarged side elevational view taken along line 15—15 of FIG. 13c.

More specifically, nailing cutter 201 comprises a pair of spaced, cantilever support arms 45a", 45b" extending from a respective trolley 47A, 47B or from frame 3 in the same manner as nailing cutter 101A, 101B or 101C. Arms 45a", 45b" are, as shown in FIG. 14, of a height less than the height of a stringer 10 of a pallet P to be disassembled whereby the arms may be readily inserted into the pallet. The arms are spaced for receiving a stringer 10 therebetween. Each arm carries at least one shear blade. As shown, and is preferred in most applications, however, each arm 45a", 45b" carries a pair of shear blades including an upper shear blade 203 and a lower shear blade 205. The upper and lower shear blades of each pair of arms are selectively operable for severing nails N holding the top slats onto the stringers or for severing the nails holding the lower slats onto the stringer in a manner as will appear. Each shear blade 203 or 205 is somewhat longer than stringer 10 of pallet P and has its cutting edge facing inwardly toward its respective stringer. Further, each blade is slidably carried on its respective arm for both longitudinal movement along the length of its arm and for transverse movement toward and away from its respective stringer. As shown, each blade is retained in sliding relation on its arm by means of a retainer plate 207. The ends of each of the blades are angled at, for example, a 45° angle and constitute a front cam surface 209 and a rear cam surface 211. A cam actuator, as generally indicated at 213, is provided for the simultaneous closing of the upper shear blades of nail cutter 201. Of course it will be appreciated that a similar cam actuator 214 (see FIG. 15) is provided for actuating the lower blades. Actuator 213 includes a cam member 215 movable in generally longitudinal direction relative to its respective shear blades and to its respective arms 45a", 45b" from a first or open position (as shown in FIG. 13a), to an intermediate position (as shown in FIG. 13b), and then to a second or closed position (as shown in FIG. 13c) by means of a hydraulic cylinder unit 217.

Cam member 215 has a V-shaped cam surface 219 cooperable with the rear cam surfaces 211 of its respective shear blades. Arms 45a", 45b" each have an angled from surface 221 cooperable with the front cam surface 209 of the shear blades. Cam rollers 223 may be disposed between the cam surfaces of the blades and support arm cam surfaces thereby to facilitate closing of the shear blades.

As shown in FIG. 14a, as hydraulic cylinder unit 217 is actuated and as cam actuator 215 is moved longitudinally toward the free ends of the support arms, cam surfaces 211 and 219 cooperate to cammingly move the rear ends of the upper shear blades inwardly toward stringer 10 positioned therebetween. Of course, it is assumed that the upper shear blades are in general heightwise alignment with the interface between the upper face of stringer 10 and the bottom face of the upper or top slats 11 of the pallet P to be disassembled. In the manner, the cutting edges of the upper shear blades enter the joint between the slats and the stringer so as to cuttingly engage nails N.

With the upper shear blades in the position shown in FIG. 13a, the rear ends of the shear blades preferably (but not necessarily) overlap with one another with one blade on top so as to form a scissors-like cutting action on nails N. Also, the rear ends of the shear blades come upon stops (not shown) so as to prevent excessive overlapping of the blades.

Upon continued longitudinal movement of cam member 215, the upper blades are urged longitudinally of arms 45a", 45b" and front cam surfaces 209 cammingly engage stationary front cam surfaces 221 on their respective support arms. Thus, relative movement between the blades and the cams causes the front ends of the blades to close. As the blades move into cutting contact with nails N, they contact the nails from front-to-rear along the length of stringer 10 in a scissors-like, nail shearing action. It will thus be appreciated that with nail cutter 201 only one nail at a time is cut by the blades thus allowing a high shearing force to be applied on each of the nails to be cut without the requirement of having to apply excessively high forces to close the blades. Of course, suitable return springs 224 may be provided in cutter 201 so as to return the shear blades to their open position upon hydraulic cylinder unit 215 being returned to its first or open position. It will be understood that the bottom shear blades are constructed and operated in the same manner as the above-described top shear blade.

After the top nails N of pallet P have been cut, as above described, table 7 is raised so that the bottom blades 205 are in alignment with the bottom interface between stringers 10 and bottom slats 11 of the pallet. Thus, the bottom blades may be closed in the same manner as above described so as to cut bottom nails N. It can thus be readily appreciated that both the top and bottom nails of pallet P may be cut without the necessity of handling the pallet or repositioning the pallet relative to the nail cutters other than the above described heightwise adjustment of table 7.

It will be further appreciated that if either nail cutter 101A, 101B, 101C, or 201 are used, the provision of a retractable front abutment member 23', as shown in FIG. 16 may be preferred. Briefly, abutment member 23' is mounted on compression coil springs 301 which permit it to move into a retracted position within a recess 303 provided in the front portion of table 7 upon the raising of the table so as to effect alignment of the bottom interface between the pallet slats and the stringers with the lower shear blades of the nail cutters. It will be appreciated that as table 7 is raised, the top of abutment member 23' engages the nail cutters or their cantilevered support arms and thus is forced downwardly into its recess against the bias of springs 301. Also, prior to raising table 7, it will be appreciated that clamp member 25 is moved to its unclamped position so that it will not interfere with the cantilever support arms for the nailing members.

From the above description of the operation of apparatus 1 with nailing cutters 9A, 9B and 9C with nailing cutters 101A, 101B and 101C, for the sake of brevity, the method of this invention is believed to be abundantly clear to one skilled in the art and thus it is not believed necessary to set the method out in detail in this specification.

Of course, it will be understood that if one is disassembling a pallet P having more than three stringers, either additional nail cutting means 9, 101, or 201 may be provided so as to simultaneously effect the cutting of all slats from the stringers, or after cutting some of the slats from the stringers, the table 7 may be returned to its retracted position, clamp 25 loosened, and the pallet shifted transversely relative to the nail cutter so as to align another of the nail cutters up with the other stringers of the pallet. Also, for economical versions of the present apparatus, only one of the above-described nailing cutters need be used and that the pallet being disassembled may be shifted in transverse direction so as to align its stringers with the one nailing cutter.

As shown, apparatus 1 has its rails 5 on the outside of its frame. It will be appreciated that the rails could be moved inboard of the frame so as to expose winch assembly 33 and hydraulic cylinders 21 and 29 for more ready servicing thereof.

In this disclosure, the term "shear" is used in a generic sense to refer to any cutting or breaking action of nails N holding the slats to the stringers of a pallet.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

I claim:
1. Method of disassembling a nailed together wood structure, such as a wood pallet or the like, having a plurality of longitudinal stringers and a plurality of slats extending transversely of the stringers and nailed to at least one face of the stringers, said method comprising the steps of:
   moving a wood structure from a loading position to a cutting position, said wood structure being moved in the longitudinal direction of its above-said stringers;
   positioning a pair of shear blades on opposite sides of one stringer at a respective interface of said one stringer and the slats nailed thereto, said shear blades being movable toward and away from one another between a retracted position in which said shear blades are clear of said wood structure and a cutting position in which the shear blades cooperate with one another so as to shear said nails; and actuating said shear blades for movement from their retracted to their cutting positions so as to shear the nails holding said slats to said one stringer at said one interface thereby freeing the slats from said one stringer.

2. The method of claim 1 wherein said pallet further has other stringers nailed to the other faces of its stringers, said method further comprising the steps of:

positioning another pair of shear blades on opposite sides of said one stringer at the other interface of said one stringer and the other slats nailed thereto; and actuating said other shear blades so as to shear all of the nails holding said slats to said one stringer at said other interface thereby freeing said one stringer from said other slats.

3. The method of disassembling a nailed together wood structure, such as a wood pallet or the like, having a plurality of longitudinal stringers and a plurality of slats extending transversely of the stringers and nailed to at least one face of the stringers, said method comprising the steps of:

moving a wood structure from a loading position to a cutting position, said wood structure being moved in the longitudinal direction of its above-said stringers;

positioning a plurality of pairs of shear blades on opposite sides of respective stringers at said one interface between said stringers and said slats; and actuating the shear blades so as to substantially simultaneously cut the nails holding the slats to their respective stringers said one interface.

4. The method of disassembling a nailed together wood structure, such as a wood pallet or the like, having a plurality of longitudinal stringers and a plurality of slats extending transversely of the stringers and nailed to at least one face of the stringers, said method comprising the steps of:

moving a wood structure from a loading position to a cutting position, said wood structure being moved in the longitudinal direction of its above-said stringers;

positioning a pair of shear blades on opposite sides of one stringer at a respective interface of said one stringer and the slats nailed thereto; and actuating said shear blades so as to shear all of the nails holding said slats to said one stringer at said one interface thereby freeing the slats from said one stringer said method wherein as said shear blades are actuated, they substantially simultaneously shear all of the nails holding said slats to said respective stringer at said one interface.

* * * * *